United States Patent [19]
Sakamoto et al.

[11] Patent Number: 5,121,511
[45] Date of Patent: Jun. 16, 1992

[54] SHOWER DEVICE

[75] Inventors: Jyunichi Sakamoto; Tetsuya Onkura; Tsukasa Harada, all of Kadoma, Japan

[73] Assignee: Matsushita Electric Works, Ltd., Osaka, Japan

[21] Appl. No.: 608,368

[22] Filed: Nov. 2, 1990

[30] Foreign Application Priority Data

Nov. 27, 1989 [JP] Japan .................. 1-307106
Dec. 15, 1989 [JP] Japan .................. 1-326377

[51] Int. Cl.⁵ ......................... A47K 3/22; G05D 7/00
[52] U.S. Cl. ........................................... 4/601; 4/614; 4/615; 137/871; 251/30.02
[58] Field of Search ............... 4/601, DIG. 3, 623, 4/605; 251/30.02; 137/870, 871

[56] References Cited

U.S. PATENT DOCUMENTS

| | | | |
|---|---|---|---|
| 1,572,275 | 2/1926 | Ewing | 4/601 X |
| 3,379,406 | 4/1968 | Greer | 251/45 |
| 4,756,030 | 7/1988 | Juliver | 4/DIG. 3 X |
| 4,872,224 | 10/1989 | Grimes et al. | 4/568 |
| 4,914,758 | 4/1990 | Shaw | 4/623 X |
| 4,941,219 | 7/1990 | Van Marcke | 4/623 |
| 4,967,996 | 11/1990 | Sonoda et al. | 251/30.02 |

FOREIGN PATENT DOCUMENTS 63-15885   2/1988  Japan .
1-316586  12/1989  Japan .
2-98791    8/1990  Japan .

Primary Examiner—Daniel M. Yasich
Attorney, Agent, or Firm—Burns, Doane, Swecker & Mathis

[57] ABSTRACT

A shower device includes a plurality of nozzles provided to a housing, supplied hot and cold water to the nozzles being turned on and off through solenoid valves which are provided in a self-maintaining type and are supplied with a power from a low voltage power source through a controller. The device is thereby made simple and easy in its installation and to be operable for a long term with considerably low voltage and small power.

12 Claims, 6 Drawing Sheets

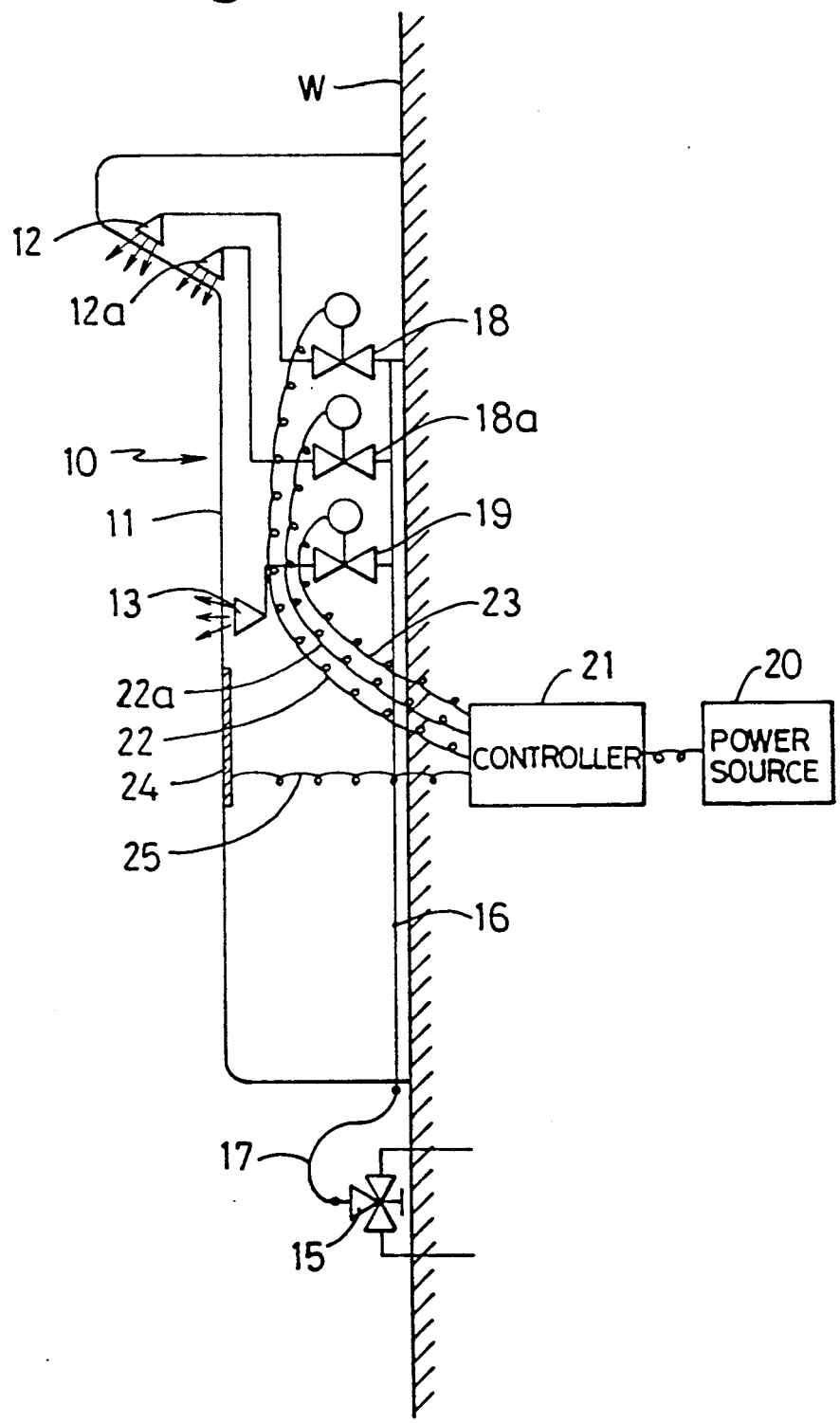

SHOWER DEVICE

BACKGROUND OF THE INVENTION

The invention relates to shower devices and, more particularly, to a shower device for ejecting hot and cold water through shower nozzles under a control by means of solenoid valves.

DESCRIPTION OF RELATED ART

In recent years, the shower device has been generally utilized as a convenient bathing means in view of its easiness of preparations for the bathing and effective contribution to water and energy saving, and has been attracting public attention because of its capability of simultaneous acquisition of skin stimulation and thermal excitement with ejected pressure of shower, for health promotion purpose.

Hitherto, various types of the shower device having many shower nozzles have been suggested, an example of which would be one described in Japanese Utility Model Appln. Laid-Open Publication No. 63-15885. This shower device has a plurality of shower nozzles provided to a shower body on the reverse side of which a solenoid valve unit for turning on and off the water supply to the shower nozzles and required piping therefor are provided. However, this device is designed to form by itself a part of shower room wall so that there have been drawbacks that an additional construction work is necessitated for assuring a mounting space on the wall, electric wiring works for controlling system with respect to the solenoid valves as well as plumbings for water supply are made necessary and thus the installation work has to be of a relatively much larger scale.

In Japanese Utility Model Appln. Laid-Open Pub. No. 2-98791, there is disclosed a shower device in which a shower housing provided with shower nozzles is to be installed against a wall of shower room or the like. In this case, too, it is still necessary to embed the solenoid valves in wall body behind the shower device housing, and to provide coupling joints between water supply pipes laid to extend in the wall body and further water supply pipes provided in the shower device body to be connected to the shower nozzles, so that a problem is involved in rendering the installation of the shower device to be a relatively large scale construction.

With the foregoing shower devices, further, it has been necessary to continuously supply the electric power to the solenoid valves during their opening operation, so that the solenoid valves have not been allowed to be installed inside the shower device housing and, generally, the installation of these shower devices has to be limited to be at the time when a house is newly built or an existing house is subjected to a large extent reconstruction or repair, so as to be poor in general usefulness.

SUMMARY OF THE INVENTION

A primary object of the present invention is, therefore, to provide a shower device which can eliminate the foregoing problems and allows its installation to be readily carried out with respect to wall surface of existing shower room or bath room.

Another object of the present invention is to provide a shower device which can realize opening and closing driving of the solenoid valves with an application of a low voltage.

Other objects and advantages of the present invention will be made clear in following description of the invention detailed with reference to preferred embodiments shown in accompanying drawings.

BRIEF EXPLANATION OF THE DRAWINGS

FIG. 2 is a schematic explanatory view for the shower device of FIG. 1;

While the present invention shall now be detailed in the followings with reference to the embodiments shown, it should be appreciated that the intention is not to limit the invention only to such embodiments, but rather to cover all alterations, modifications and equivalent arrangements possible within the scope of appended claims.

DETAILED DESCRIPTION OF THE PREFERRED EMBODIMENTS

Figure 1:
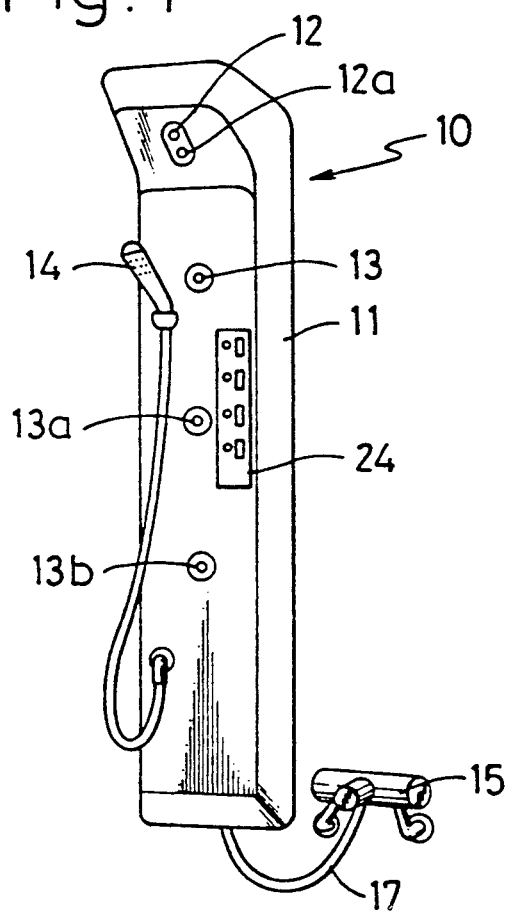
FIG. 1 shows in a schematic perspective view the shower device in an embodiment according to the present invention.

Referring here to FIGS. 1 and 2, the shower device 10 in an embodiment of the present invention comprises a housing 11 to which shoulder-beating shower nozzles 12 and 12a, body-showering nozzles 13, 13a and 13b and a hand-held shower nozzle 14 are mounted. Water supply to these nozzles 12 through 14 can be realized by connecting a flexible hose 17 communicating with a piping 16 in the housing 11 to an existing hot and cold water supplying faucet 15 provided to a wall surface of a bath room or the like.

As schematically shown in FIG. 2, there are connected, to the shoulder-beating shower nozzles 12 and 12a, solenoid valves 18 and 18a and, to the body-showering nozzles 13, 13a and 13b, solenoid valves 19 (while in the drawing only one corresponding to the nozzle 13 is shown for simplicity of illustration, similar valves can be connected to remaining nozzles 13a and 13b), and these solenoid valves 18, 18a and 19 are electrically connected, through connecting wires 22, 22a and 23, to a controller 21 actuated by a low voltage power source 20 which are installed outside the bath room or the like in which the shower device 10 is provided. The controller 21 is connected, through a connecting wire 25, to an operating panel 24 provided to a front face of the device housing 11, so that the controller 21 can be actuated by properly operating the operating panel 24 for opening and closing the solenoid valves 18, 18a and 19 as desired. It is preferable here to have a microcomputer 45 or the like incorporated in the controller 21 so as to allow the solenoid valves 18, 18a and 19 actuated in a predetermined sequence, and the arrangement may be so made as to realize such valve actuation by means of the microcomputer through a proper operation of keys on the operating panel 24.

The housing 11 is provided mountable against an existing wall W of the bath room or the like through such proper mounting means as mounting bracket, bolt or the like, so as to allow a simple installation of the housing realized without requiring any large scale construction with respect to the wall. The number of the nozzles and the solenoid valves as well may be properly increased or decreased as required.

Figure 3:
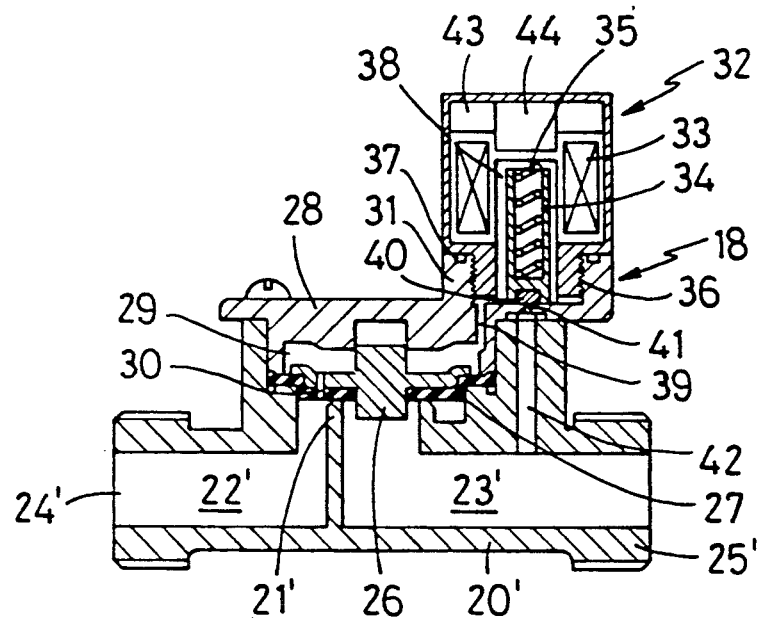
FIG. 3 shows in a sectioned view an example of solenoid valve in its closed state and to be employed in the shower device of FIG. 1.
Figure 4:
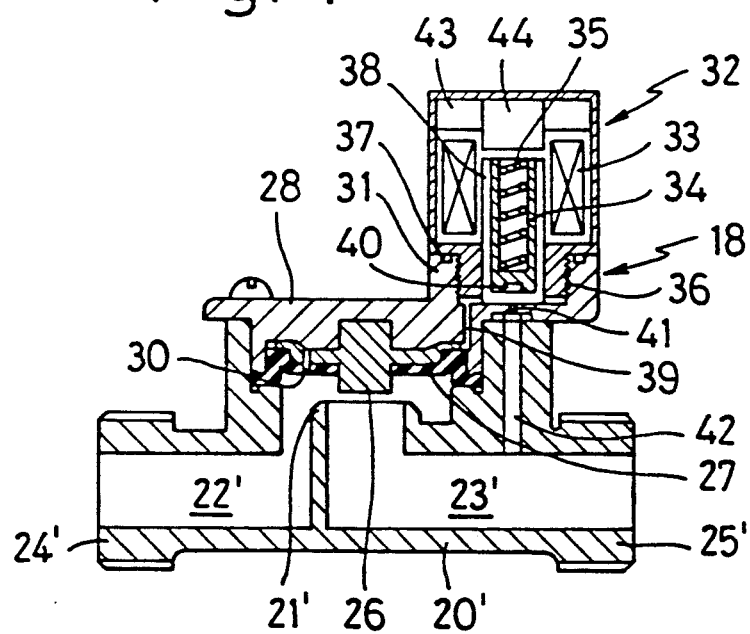
FIG. 4 shows also in a sectioned view the example of the solenoid valve of FIG. 3.

For the solenoid valves 18, 18a and 19, concretely, it is preferable to employ such self-maintaining type solenoid valve as shown in FIGS. 3 and 4. By "self-maintaining" is meant that the solenoid plunger is held in valve-opening and valve-closing positions by holders (e.g., springs and magnets) which operate independently of the electric solenoid coil as will be hereinafter explained. Referring as an example only to the solenoid valve 18 since all of the valves 18, 18a and 19 are of the same type, the solenoid valve 18 comprises a valve housing 20' including therein a valve seat 21' and water supply and discharge sides 22' and 23' defined on both sides of the valve seat 21', a water inlet port 24' connected to the water supply side 22 and a water discharge port 25' connected to the water discharge side 23'. In the housing 20', further, a main valve member 26 is disposed to be engageable with and disengageable from the valve seat 21', and an elastic diaphragm 27 is provided integral with the main valve member 26 preferably by means of bonding along peripheral part of them. These main valve member 26 and diaphragm 27 made integral with each other are disposed so that a water pressure in the supply side 22' will be applied to the peripheral part, while a water pressure in the discharge side 23' will be applied to a central part of them.

A lid 28 forming part of the valve housing 20' is fitted above the main valve member 26 to define a first pressure chamber 29 above the member 26, and this first pressure chamber 29 is made to communicate with the water supply side 22' through an orifice path 30 made to penetrate through the main valve member 26 and diaphragm 27. On one side of the lid 28, a mounting part 31 is provided to project thereout, and a solenoid 32 is mounted onto this mounting part 31. This solenoid 32 comprises a coil 33, plunger 34 consisting of a rod-shaped piston and a holder in the form of a resetting spring 35 for the plunger, and its mounting to the mounting part 31 is carried out in water tight manner by screwing a threaded bottom end of solenoid housing into a threaded port 36 of the mounting part 31, with an annular packing 37 interposed peripherally around the port 36. Further, a second pressure chamber 38 is defined to enclose the plunger 34, and this second pressure chamber 38 is made to be in communication with the first pressure chamber 29 through a communication path 39. The plunger 34 is provided at its lower end with a pilot valve member 40 mounted for opening and closing a pilot hole 41 made in the mounting part 31 to communicate, through a path 42 made in the valve housing 20', with the discharge side 23'. Further, a holder in the form of a magnetic means comprising a permanent magnet 43 and a core 44 magnetized by the magnet 43 is provided to be above the resetting spring 35.

The operation of the foregoing solenoid valve 18 shall be referred to next. Now, in a normal state of the plunger 34 urged downward by the biasing force of the resetting spring 35 and, consequently, the pilot valve member 40 closes the pilot hole 41, the first pressure chamber 29 communicates through the orifice path 30 with the water supply side 22' to have the same water pressure therewith, and the main valve member 26 is made to engage with the valve seat 21' under the elasticity of the diaphragm 27. That is, the solenoid valve 18 is in its closed state of FIG. 3. Upon excitation of the coil 33 of the solenoid 32, the plunger 34 as well as the pilot valve member 40 are driven upward, the pilot hole 41 comes in its open state to have a water pressure in the discharge side 23' applied to the first pressure chamber 29 through the path 42, pilot hole 41, second pressure chamber 38 and path 39, whereby the pressure in the first pressure o 5 chamber 29 is made lower than that in the supply side 22', the main valve member 26 is caused to disengage from the seat 21' by the pressure in the supply side 22' now higher, the main valve member 26 thus comes to its open state so that the water supply and discharge sides 22' and 24' are in direct communication with each other. That is, the solenoid valve 18 is in its open state of FIG. 4.

In the above operation, a current feed to the coil 33 of the solenoid 32 in a direction of separating the plunger 34 from the pilot hole 41 causes the plunger 34 to be driven upward, the upper end of the plunger 34 is attracted to the magnetized core 44, the plunger 34 is thereby held in the position as separated from the pilot hole 41 resisting against the biasing force of the resetting spring 35, and the pilot valve member 40 mounted to the plunger 34 is held thereby in its open state. When, on the other hand, a current is fed to the coil 33 in the other direction of overcoming the magnetic attraction of the core 44, the plunger 34 is caused to be driven downward and toward the pilot hole 41 under the biasing force of the resetting spring 35 now made effective, and the pilot valve member 40 is held in its closed state. That is, when the pilot valve member 40 is driven into either one of the opened and closed states, such state of the pilot valve member 40 is to be self-maintained either by means of the magnetic attraction of the core 44 or the biasing force of the resetting spring 35, even when the current feed to the coil 33 of the solenoid 32 is turned off. In other words, with the employment of the self-maintaining type solenoid valve having the pilot valve member, it is made possible to render the displacement of the plunger 34 to be smaller, and to render the current feed to the coil 33 of the solenoid 32 reduced so as to be only for a short period under such a low voltage as to be DC 5 to 6 V, good enough for limiting required power consumption for each operation of each solenoid valve to be only about 35 mJ, so that the shower device can be actuated sufficiently and for a long time period even with such low voltage power source 20 as a battery.

Figure 5:
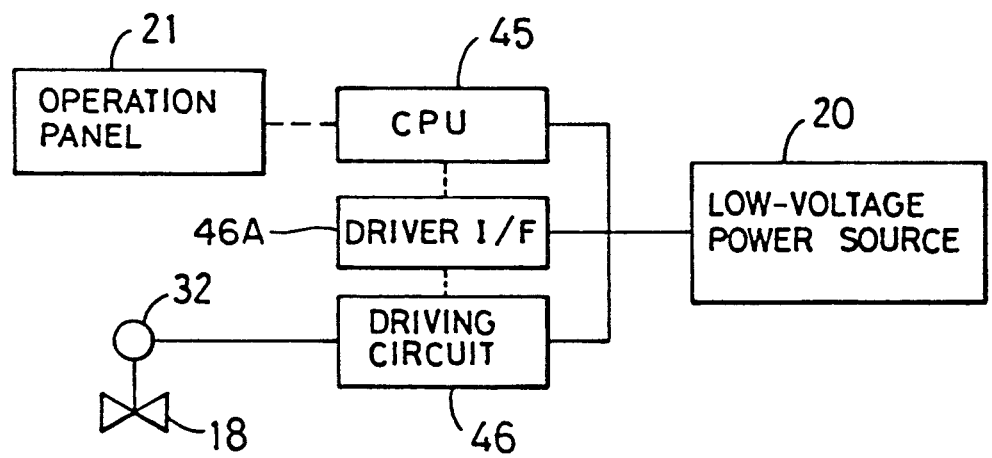
FIG. 5 is a block circuit diagram of a power supply circuit with respect to the solenoid valves in the shower device of FIG. 1.

The power supplied from the low voltage power source 20 is to be supplied to the solenoid 32 of the solenoid valve 18, as shown in FIG. 5 via a CPU 45 or a driving circuit 46 included in the controller 21 which receives signals from the operating panel 24. Signals from the CPU are converted into signals compatible with the driving circuit by a driver interface 46A.

It has been found in the above connection that, assuming here that the shower device 10 is utilized every day by a family of four for 10 minutes by each person, the low voltage power source 20 consisting of four dry cells of type SUM-2 (NG) of 1.5 V to be 6 V in total. with a concurrent use of a capacitor discharge circuit, has been durable for about one year use, so as to be sufficiently utilizable in practice.

Figure 6:
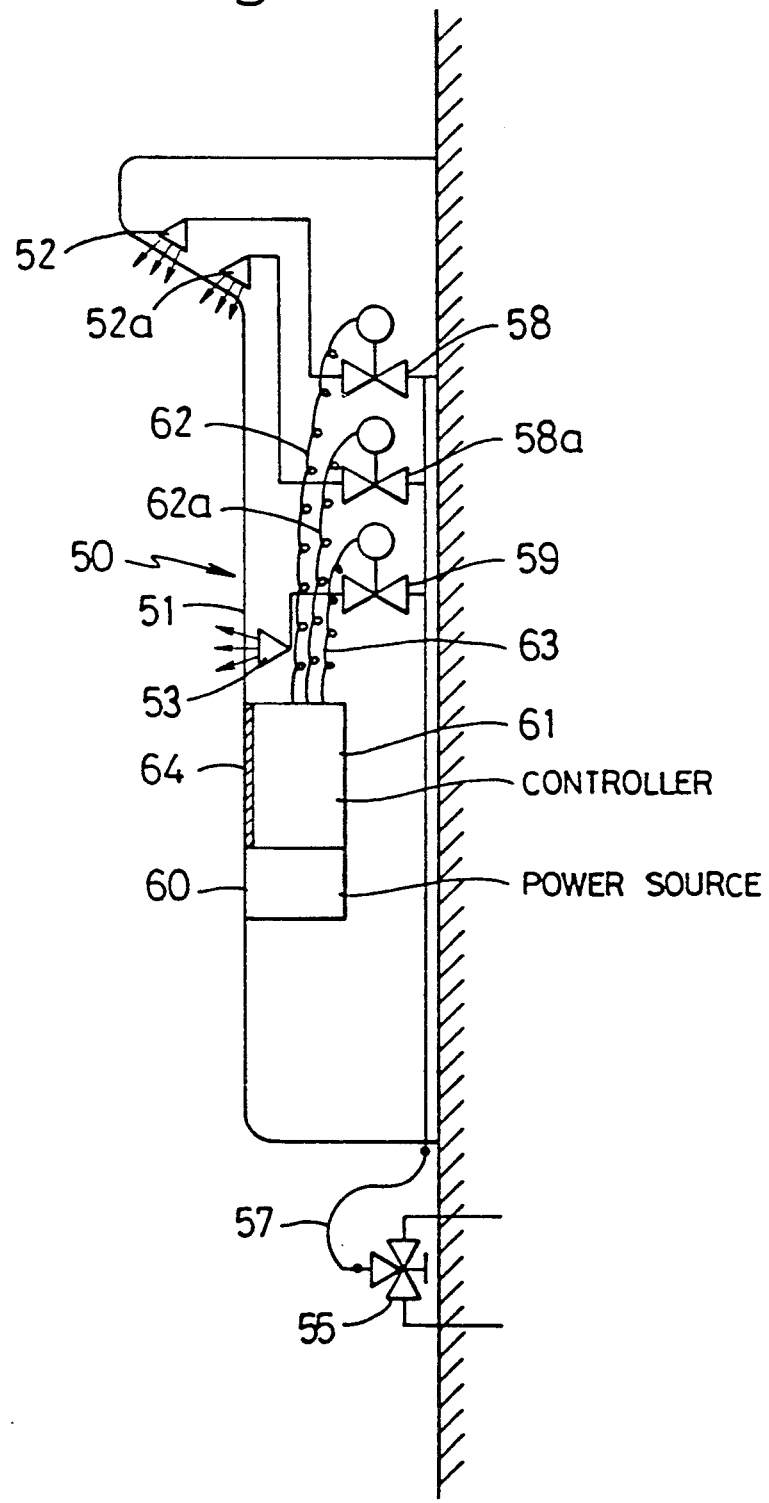
FIG. 6 is a schematic explanatory view for another embodiment of the shower device according to the present invention.

Referring next to FIG. 6, there is shown another embodiment of the shower device 50 according to the present invention, in which the controller 61 and low voltage power source 60 are water tightly accommodated in the housing 51, in contrast to the foregoing embodiment shown in FIGS. 1 and 2, whereby the installation of the shower device 50 can be further simplified. In the present embodiment, other constituents and their function are the same as those in the foregoing embodiment, and the same reference numerals as those used in FIGS. 1 and 2 but as added by 40 are used in FIG. 6 for the same constituents.

Figure 7:
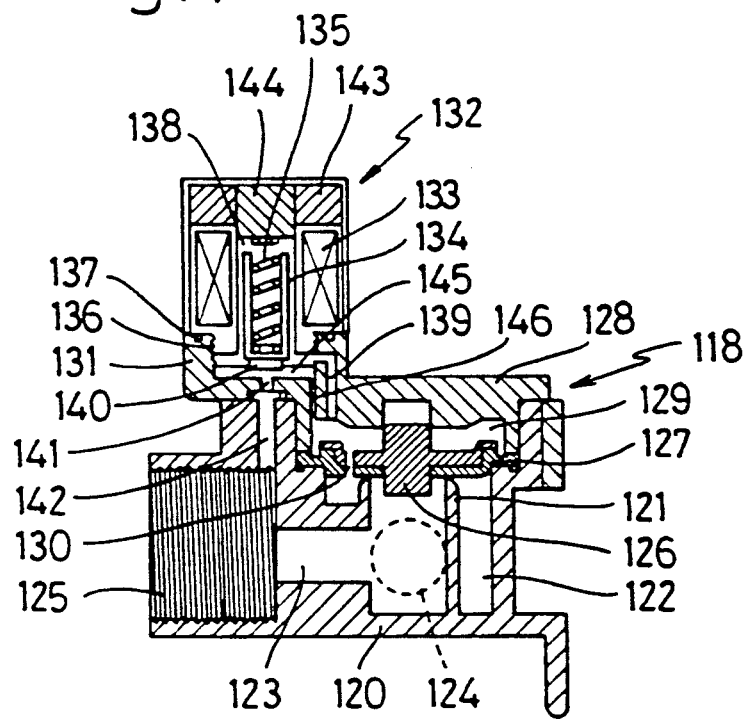
FIG. 7 shows in a sectioned view another example of the solenoid valve employed in the embodiment of FIG. 1 or 6.
Figure 8:
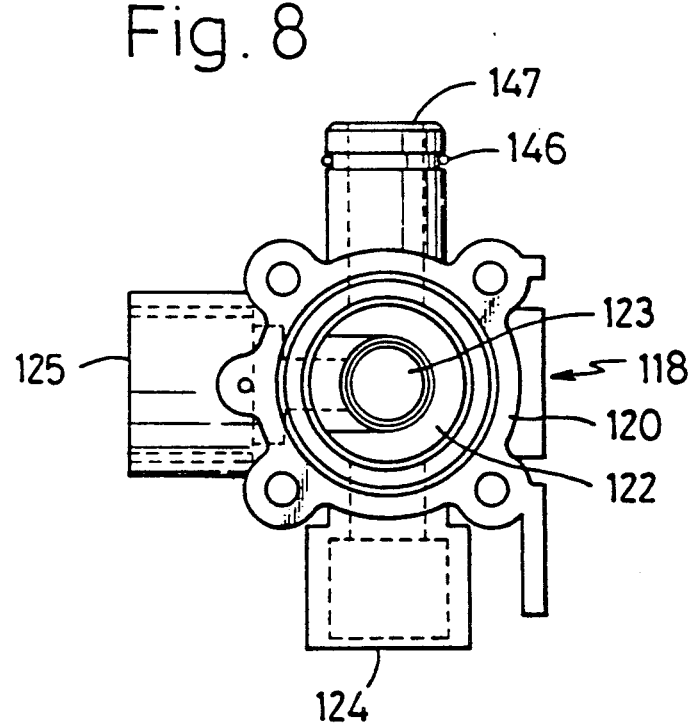
FIG. 8 is a plan view of the solenoid valve of FIG. 7.

In FIGS. 7 and 8, there is shown another example of the solenoid valve 118 employable in the shower device according to the present invention, in which the pilot valve member 140 provided below the plunger 134 of the solenoid 132 consists of a diaphragm pilot valve. Below this diaphragm pilot valve 140, a pilot chamber 145 is defined as made to communicate directly with the pilot hole 141 and, through a path 146, with the first pressure chamber 129. Since in this case the second pressure chamber 138 and the pilot chamber 145 achieve the same pressure on both sides of the diaphragm pilot valve 140 through the both paths 139 and 146, the diaphragm pilot valve 140 and plunger 134 as well can be more smoothly driven, and the low voltage drivability of the solenoid valve can be more improved in addition to the small displacement arrangement of the plunger 134.

Figure 9:
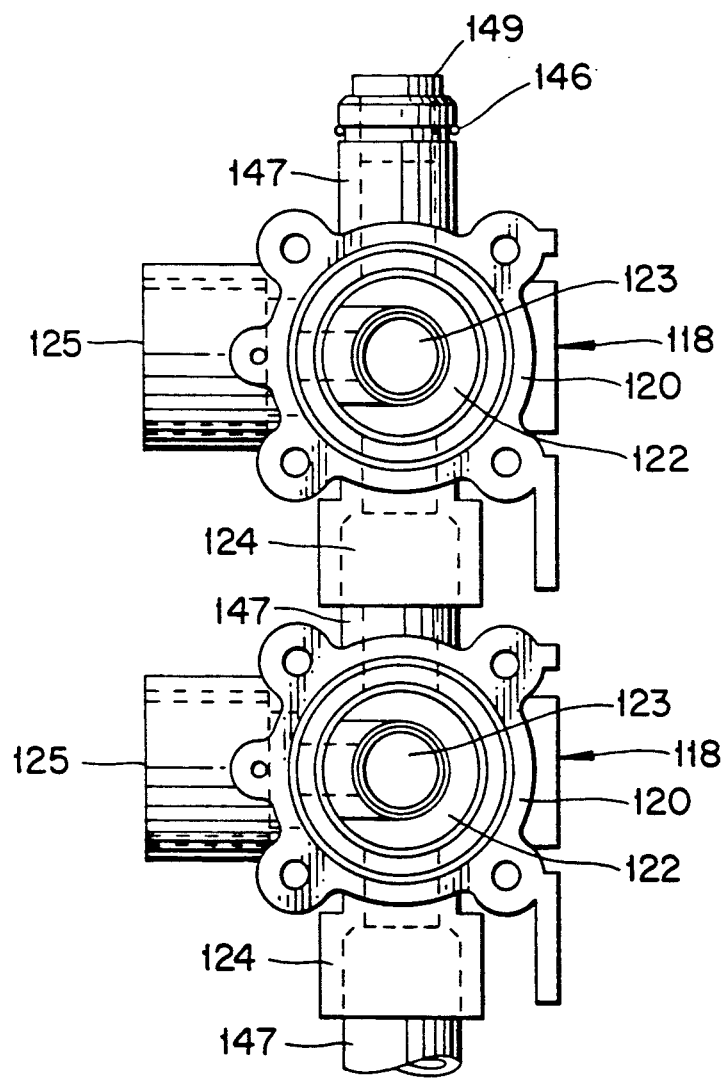
FIG. 9 is a plan view of the valves 118 connected in series.

In the present solenoid valve 118, further, there is provided a supplied water outlet 147 on the water supply side 122 and to be on opposite side to the water inlet port 124 so as to communicate directly and straightly with the inlet port 124, while an O-ring 146 is mounted peripherally about the supplied water outlet 147 for its water-tight coupling to the supplied water inlet port 124 of another solenoid valve of the same type. Here, it will be readily appreciated that a plurality of the solenoid valves 118 can be arranged in an array by mutually coupling the supplied water outlet 147 of one solenoid valve 118 to the supplied water inlet port 124 of another solenoid valve 118. As shown in FIG. 9 more than two of the solenoid valves 118 can be disposed in series by the sequential coupling of the outlet 147 of each solenoid valve 118 to the inlet port 124 of another solenoid valve 118, while connecting the inlet port 124 of the first stage solenoid valve 118 to an outlet port of a connecting joint (not shown) an inlet port of which is connected to a water supply source, and closing the outlet 147 of the last stage solenoid valve 118 by means of a cut-off plug 149.

In the example of the solenoid valve shown in FIGS. 7 and 8, other constituents and their function are the same as those in the example of FIGS. 3 and 4, and the same constituents in FIGS. 7 and 8 are denoted by the same reference numerals as used in FIGS. 3 and 4 but as added by 100.

What is claimed is:
1. A shower device comprising:
A) a main housing adapted to be mounted on a shower stall surface;
B) a plurality of shower nozzles mounted in vertically spaced relationship in said main housing for discharging water;
C) a plurality of valves mounted in said main housing and operatively connected to respective ones of said nozzles for controlling the water flow thereto, each of said valves including:
  1) a solenoid plunger movable between valve-opening and valve-closing positions,
  2) an electric solenoid coil for displacing said plunger toward and away from said valve-opening and valve-closing positions,
  3) first holding means operable independently of said coil for releasably holding said plunger in said valve-closing position, and
  4) second holding means operable independently of said coil for releasably holding said plunger in said valve-opening position,
  5) said coil being energizable to selectively release said plunger from said first and second holding means;
D) a low voltage power source operably connected to said coils for energizing said coils; and
E) manual operating controls mounted on said main housing for controlling the supply of said low voltage to said coils;
F) said main housing, said shower nozzles, said valves, and said manual controls being mountable as a single unit to said shower stall surface.

2. A shower device according to claim 1, wherein each of said valves includes a water supply passage, a water discharge passage, a main valve seat separating said water supply and discharge passages, and a main valve member movable against said main valve seat to close said valve when said plunger is in said valve-closing position, and movable away from said main valve seat to open said valve when said plunger is in said valve-opening position, said main valve member including an elastic diaphragm which is biased against said main valve seat solely by its own inherent resiliency.

3. A shower device according to claim 2, wherein each of said valves comprises a valve housing forming said fluid supply passage, said fluid discharge passage and said main valve seat; said fluid supply passage communicating with a first side of said main valve member; first pressure chamber communicating with a second side of said main valve member disposed opposite said first side thereof; a fluid path communicating said first pressure chamber with said fluid supply passage and tending to equalize pressures on said first and second sides of said main valve member when said main valve member is in engagement with said main valve seat; a pilot chamber arranged in said valve housing in communication with said first pressure chamber; a pilot valve seat disposed between said fluid discharge passage and said pilot chamber; pilot valve means arranged to open and close said pilot valve seat for opening and closing communication between said first pressure chamber and said fluid discharge passage, said pilot valve means including said plunger, said coil, and said first and second holding means.

4. A shower device according to claim 1, wherein said low voltage power source is mounted in said main housing.

5. A shower device according to claim 4, wherein said low voltage power source comprises a battery.

6. A shower device according to claim 1, wherein one of said first and second holding means comprises a magnet.

7. A shower device according to claim 6, wherein the other of said first and second holding means comprises a spring.

8. A shower device comprising:

a housing, a plurality of shower nozzles mounted to said housing, a plurality of solenoid valves connected to respective ones of said shower nozzles for controlling the flow of water thereto, each of said solenoid valves including:

a water supply inlet port, a supplied water discharge port and a water supply outlet communicating internally directly with said water supply inlet port, a solenoid plunger selectively actuable between valve-opening and valve-closing positions by an electric coil, and a first and second holding means operable independently of said electric coil for releasably holding said solenoid plunger in said valve-closing and valve-opening positions, respectively, said water supply outlet of each solenoid valve being coupled to said water supply inlet port of an adjacent downstream one of the solenoid valves, whereby said solenoid valves are sequentially coupled; and a lower voltage power source for energizing said electric coils.

9. A shower device according to claim 8, wherein said lower voltage power source comprises a battery.

10. A shower device according to claim 8, wherein one of said first and second holding means comprises a magnet.

11. A shower device according to claim 10, wherein the other of said first and second holding means comprises a spring.

12. A shower device according to claim 8, which further comprises a connecting joint connected to a water supply source and having a supplied water outlet coupled to said water supply inlet port of first one of said sequentially coupled solenoid valves, and a cut-off plug fitted to said water supply outlet of last one of the sequentially coupled solenoid valves for closing the outlet.

* * * * *